Dec. 13, 1927.
H. L. MERRICK
WEIGHING MECHANISM
Filed Dec. 6, 1920
1,652,178
4 Sheets-Sheet 1
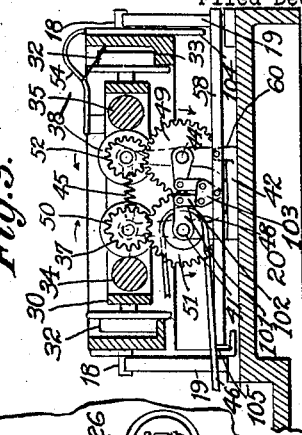
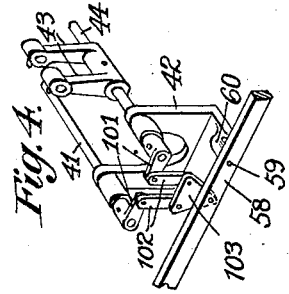
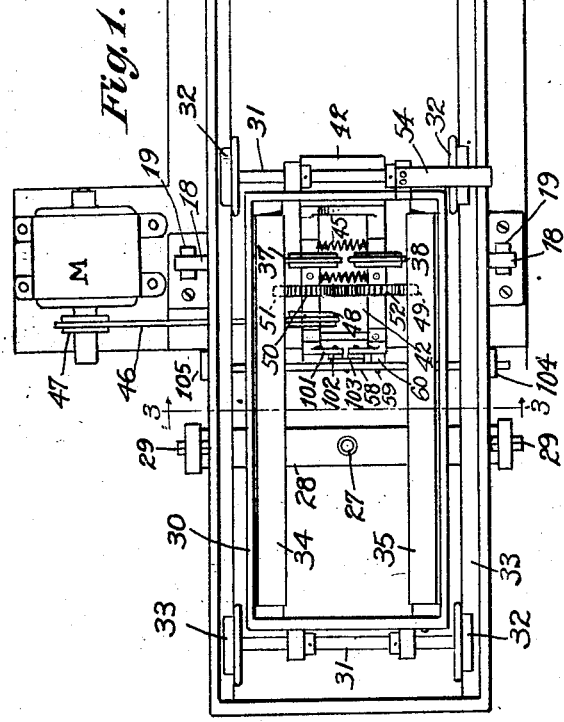
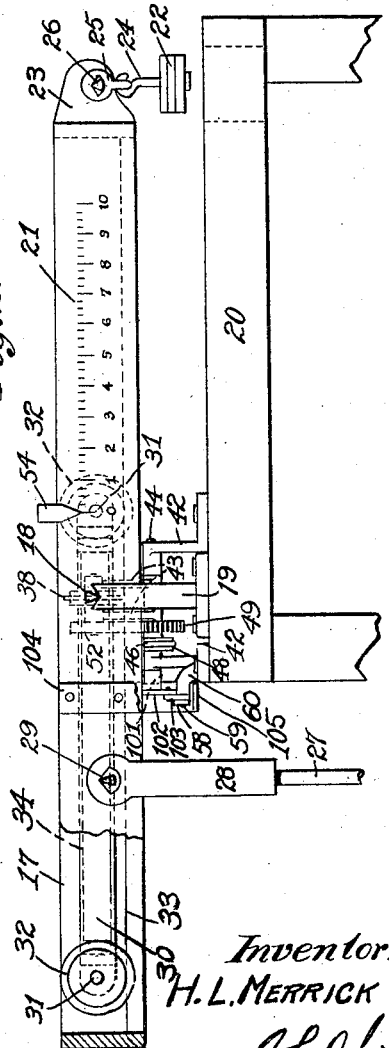
Inventor:
H. L. MERRICK
By his Attorney

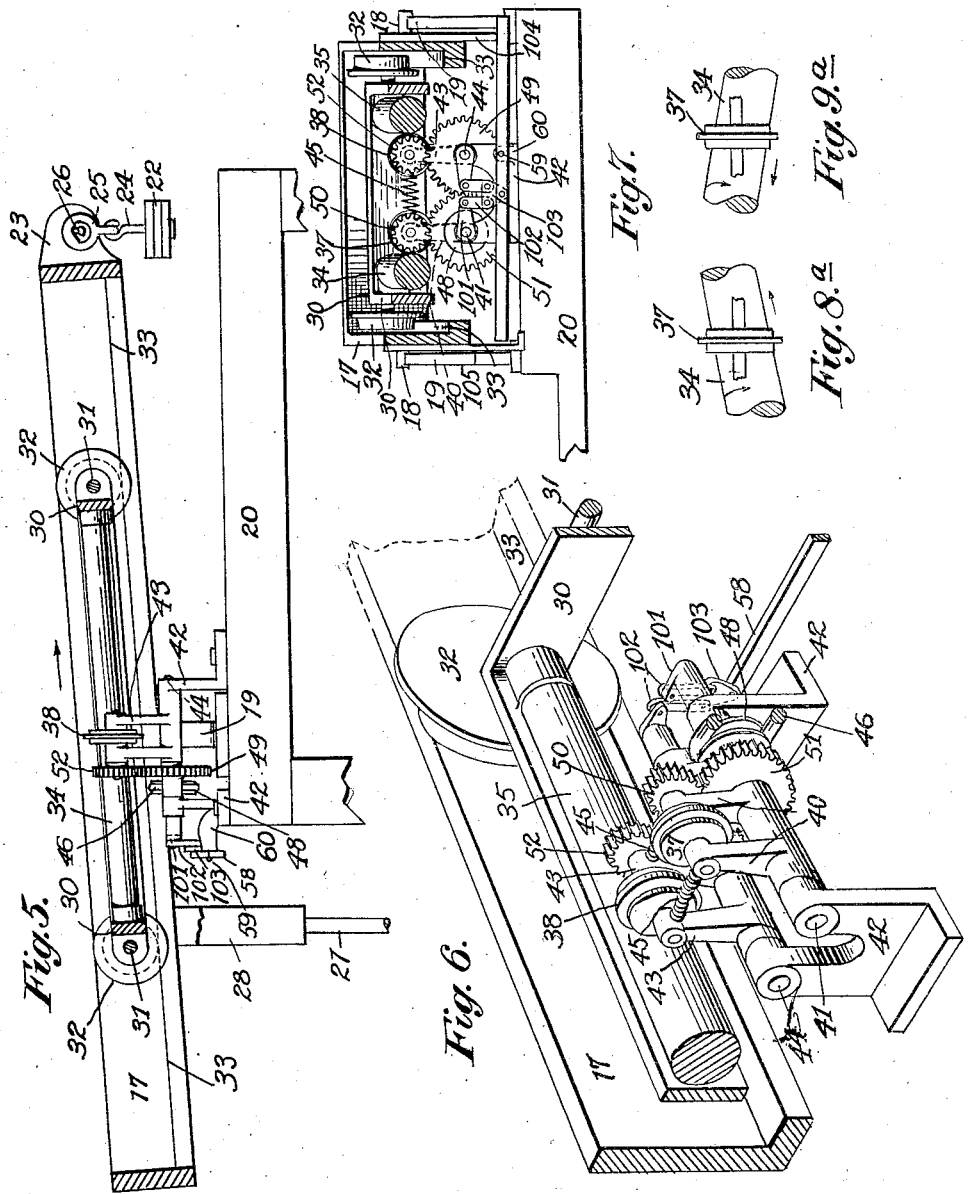

Dec. 13, 1927.
H. L. MERRICK
WEIGHING MECHANISM
Filed Dec. 6, 1920
1,652,178
4 Sheets-Sheet 3
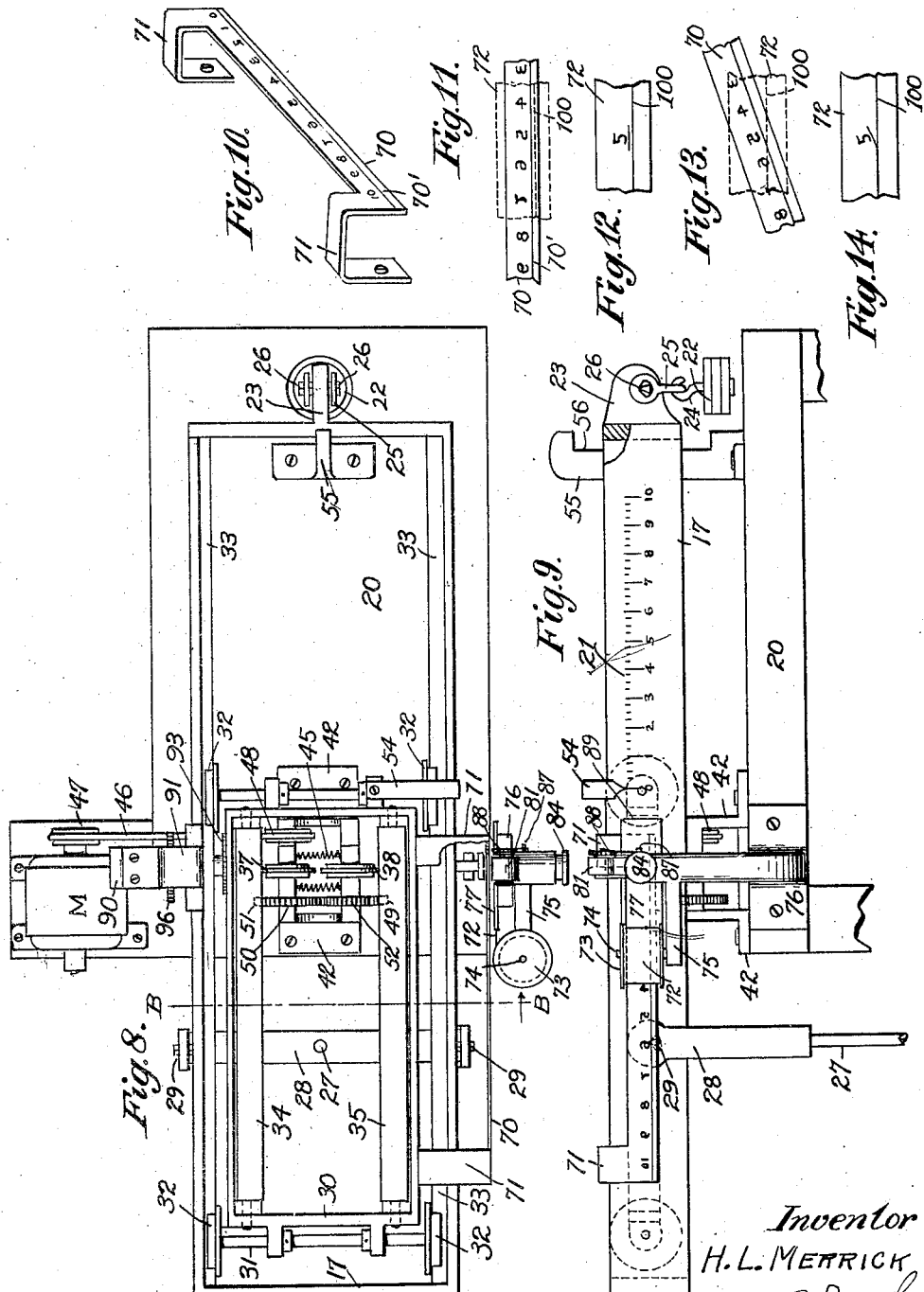
Inventor
H. L. MERRICK
By his Attorney

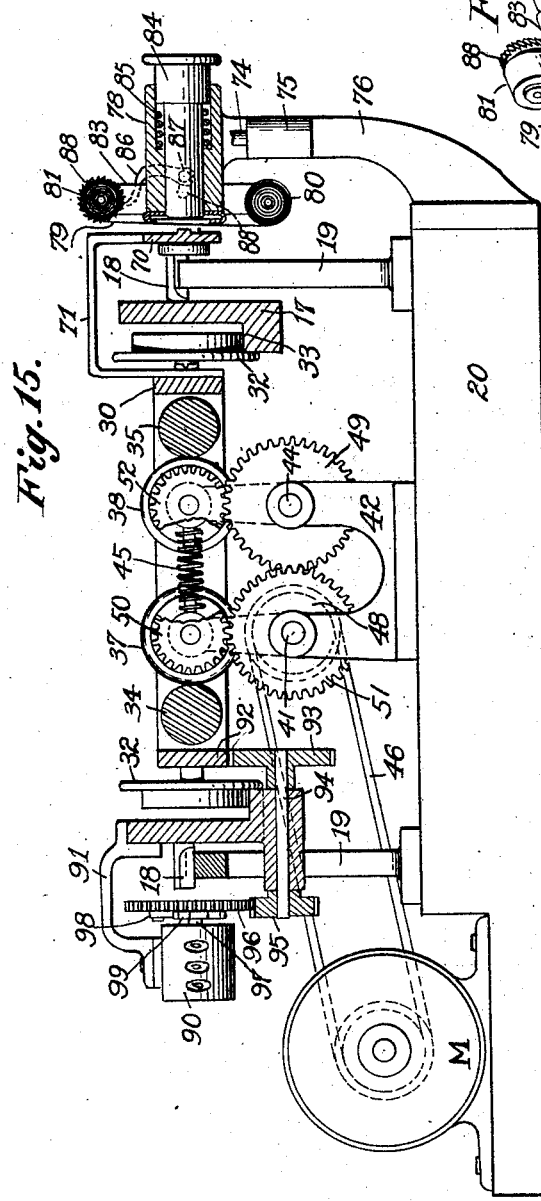

Patented Dec. 13, 1927.

1,652,178

UNITED STATES PATENT OFFICE.

HERBERT L. MERRICK, OF PASSAIC, NEW JERSEY.

WEIGHING MECHANISM.

Application filed December 6, 1920. Serial No. 428,515.

This invention relates to weighing mechanism, and it is an object of the invention to automatically adjust a counterpoise or poise weight to counterbalance a load being weighed and to return said counterpoise to initial position with the weighing mechanism in equilibrium when the load is removed from the weighing mechanism.

It is a further object of the invention to provide in weighing mechanism of the pivotally supported weighing beam type, arranged to support a load therefrom and to be maintained equilibrium, counterpoise weight movable along the weighing beam, and means to automatically move the counterpoise along the beam when the weighing beam is deflected by a load supported thereby, and to return the counterpoise weight and the beam to initial position of equilibrium when relieved of the load.

It is another object of the invention to provide means operative to make a record of the weight of successive weighings.

It is a further object of the invention to provide means to totalize the weight of successive weighings and to indicate such total weight.

In the drawings accompanying and forming a part of this specification, Figure 1 is a plan view of weighing mechanism illustrating an embodiment of my invention with a portion of the framework broken away.

Figure 2 is a front elevation to show the manner of supporting the weighing beam, and the latter being partly in section to show the manner of mounting a counterpoise or poise weight on the weighing beam.

Figure 3 is a sectional end elevation taken on the line 3—3 of Figure 1 looking in the direction of the arrows with the weighing beam in equilibrium.

Figure 4 is a perspective detail view of means to cause the means to move the counterpoise along the weighing beam to co-operate with the counterpoise.

Figure 5 is a longitudinal sectional view of the counterpoise and the means to move the same along the weighing beam to show the manner of moving the counterpoise along the beam.

Figure 6 is a perspective view of the means to move the counterpoise along the weighing beam and to show the relation thereof to a part of the counterpoise.

Figure 7 is a sectional end elevation similar to Figure 3 but showing the relation of the means to move the counterpoise along the weighing beam when the beam is deflected from the equilibrium.

Figure 8 is a plan view of weighing mechanism showing a modified embodiment of the invention with means applied thereto to make a record of successive weighings and means to totalize the weight of successive loads and indicate such total weight.

Figure 8$^a$ is a detail view to show in a diagrammatic manner the relation between the co-operating parts of the counterpoise and the means to move the same when the weighing beam is deflected from equilibrium by a load.

Figure 9 is a front elevation of the weighing mechanism shown in Figure 8 with a part of the framework broken away to show the relation of the means to make a record of successive weighings to the weighing beam.

Figure 9$^a$ is a view similar to Figure 8 but showing the relation between the co-operating parts of the counterpoise and the means to move the same when the weighing beam is deflected from equilibrium by the removal of the load therefrom.

Figure 10 is a perspective view of a portion of the means to make a record of successive weighings.

Figure 11 is a front elevation of a portion of the part of the record making means shown in Figure 10 and showing the relation of a paper strip or web thereto upon which to make a record of such weighings.

Figure 12 is a detail of a portion of a strip or web upon which the record is made of successive weighings and showing the arrangement of the record to indicate that the weighing beam was at equilibrium when the record was made.

Figure 13 is a diagrammatic view to illustrate the relation of the strip to the record making means when the beam is not in equilibrium.

Figure 14 is a view similar to Figure 12 but showing the record made thereon when the weighing beam is out of equilibrium.

Figure 15 is an enlarged cross sectional view taken substantially on the line B—B of Figure 8 to show the relation of the means to make a record of successive weighings and the means to totalize and indicate the total weight of successive weighings to the weighing beam and counterpoise.

Figure 16 is a detail view to show the manner of operatively connecting a counter to the counterpoise weight to totalize the weight of successive weighings; and Figure 17 is a perspective view of the means to make a record of successive weighings.

Similar characters of references designate like parts throughout the different views of the drawings.

In the embodiment of the invention shown in the drawings a weighing or scale beam 17 of rectangular open frame structure is supported by knife edge bearings on pivots 18 projecting laterally from the opposite longitudinal members of the beam resting upon bearings 19 fixed to and extending upward from a shelf 20 of the framework of the weighing mechanism. One of the longitudinal beam members constituting the front of the scale beam is provided with graduations and indices or digits, as shown at 12 to indicate the weight of successive loads. Counterweights 22 are suspended from a projection 23 centrally at one extremity of the beam by means of a rod 24 connected to a clevis 25 having a knife edge bearing on pivots 26 projecting from opposite sides of the projection 23 to counterbalance the dead weight of the empty scale pan or platform (not shown) connected to the scale beam by a rod 27 connected to a yoke 28 to embrace the opposite sides of the scale beam and having perforations arranged to engage knife edge bearings on pivots extending from opposite sides of the scale beam as shown at 29.

A counterpoise or poise weight in the form of a carriage comprising a rectangular open frame 30 is suspended from opposite ends by axles 31 having flanged wheels 32 journaled on the ends to run upon tracks formed by inwardly extending flanges 33 on the side members of the weighing beam to mount the counterpoise carriage upon the weighing beam to have movement along the same. A pair of rollers 34, 35 are journaled at opposite ends in the end members of the counterpoise carriage frame to extend longitudinally and near the side members of said carriage frame. These rollers are arranged with their axes parallel with the scale beam and in a plane with the axis of the pivotal support 18 of the beam. The support for the scale pan or platform and the counterpoise carriage is so arranged that in the normal position of the counterpoise carriage the scale beam will be maintained in equilibrium by the counterweights 22.

As stated it is an object of the invention to automatically and mechanically move the counterpoise along the scale beam when the beam has been deflected from the equilibrium or horizontal by a load placed upon the scale beam to counterbalance and weigh such load, or the removal of the weight of such load from the scale beam. For this purpose a pair of disks 37, 38 are provided to frictionally engage the periphery of the rollers and are continuously rotatable in opposite directions as indicated by the arrows in Figure 3 with their axes parallel with the axes of the rollers and in a plane with the axis of the scale beam pivot supports 18.

The driving disk 37 is rotatably supported by arms 40 mounted on a shaft 41 journaled at opposite ends in brackets 42 secured to and extending upward from the shelf 20. The driving disk 38 is rotatably supported similarly to the disk 37 by arms 43 mounted on a shaft 44 also journaled in the brackets 42. The driving disks 37, 38 are yieldingly urged in opposite directions and toward the rollers by springs 45 tensioned between the respective disk carrying arms 40, 43 and retained in position by pins fixed in said arms engaging in the end coils of the springs. The driving disks are positively driven in opposite directions from a suitable source and are shown as driven from an electric motor (designated in a general way by M) mounted upon the framework, by a belt 46 passing around a pulley 47 on the motor shaft and a pulley 48 loose on the shaft 44. The disk 37 is driven by a gear 51 loose on the shaft 41 to which the pulley 28 is connected to rotate therewith meshing with a pinion 50 rotatable with the disk 37. The disk 38 is driven by a gear 49 loose on the shaft 44 meshing with the gear 51, and which gear 49 meshes with a pinion 52 rotatable with the disk 38. It will be obvious that by this driving arrangement the disks may have movement toward each other and toward the rollers 34, 35 and at the same time be maintained in operative connection with their driving means.

In the normal position of the weighing mechanism with no load the counterpoise carriage 30 is at the extreme left of the scale beam 17 with the scale beam in horizontal position and equilibrium, and a pointer 54 fixed to the carriage registering with the "0" digit of the graduations of the scale beam, as shown in Figures 2 and 9. In this position the axes of rotation of the rollers 34, 35 and driving disks 37, 38 are parallel, and as a consequence thereof as the driving disks are rotated both of the rollers will be revolved in opposite directions, but there will be no tendency of the rollers to travel longitudinally in a direction of their axes of rotation and no movement will be imparted to the counterpoise carriage; nor will the equilibrium of the beam be disturbed as the points of contact between the driving disks and rollers lie in a plane with the axis of the pivotal support of the beam about which it turns as shown in Figure 7.

As a load is applied to the scale beam the load supporting or short end of the beam is deflected downward, the beam with the carrier and the rollers inclining in a direction as shown in Figure 5, but without any change in the position of the driving disks 37, 38, with the result that the axis of the rollers 34, 35 are in angular relation to the axes of the driving disks as shown diagrammatically in Figure 8ª. By thus inclining the rollers 34, 35 to the axes of the driving disks the disks do not rotate the rollers as fast as when the latter are in a horizontal plane, but now exert an axial thrust to push the rollers longitudinally and therewith the carriage in a direction toward the higher end of the beam due to the axial thrust of the circumferential force applied to the rollers by the driving disks. This movement of the counterpoise-carriage will be continued so long as the scale beam is out of equilibrium and until the beam is brought to equilibrium and the load counterbalanced by the movement of the counterpoise carriage along the scale beam, this movement of the counterpoise being at a velocity varying with the amount of deflection of the beam from the position of equilibrium.

As the counterpoise carriage moves along the scale beam the pointer 54 will move therewith and as the beam is brought to equilibrium will co-operate with the graduations on the scale beam to indicate the weight of the load. As the counterpoise carriage approaches the position to bring the scale beam to equilibrium the movement of the counterpoise will be gradually retarded and thereby preventing any tendency of the counterpoise to overrun its correct position and overbalance the load being weighed. As the load is removed due to the forward position of the counterpoise carriage the forward end of the beam, as viewed from Figures 2, 5 and 9, is deflected to incline downward and the axes of rotation of the rollers 34, 35 will be inclined relative to the driving disks 37, 38 as shown diagrammatically in Figure 9ª, and the axial component of the circumferential force applied by the disks to the rollers to push the rollers and thereby the counterpoise carriage in a direction opposite to that in which it was moved when a load was being weighed or counterbalanced, and this return movement of the carriage will be continued until the beam is restored to initial position of equilibrium and in position to weigh another load.

It will be noted that the traveling counterpoise weight carriage is moved so as to counterbalance a load being weighed in a manner similar to that as in ordinary hand weighing, but that it is moved automatically to the exact counterbalance position, and when the load is removed it is automatically returned to initial position.

In weighing mechanism as above described the pressure with which the disks frictionally engage the rollers through the action of the springs 45 is sufficient to revolve the rollers and move the counterpoise carriage to counterbalancing position along the scale beam, and particularly as shown in Figures 8 and 9, and to prevent the scale beam from being moved to too great an angle whereby the disks would not be effective to exert a longitudinal push upon the counterpoise carriage through the rollers a beam stop is provided, and shown in said Figures 8 and 9 as consisting of an arm 55 secured to the shelf 20 to extend upward and so arranged that the end member of the beam will move in a recess 56 and the shoulders formed by the ends of the recess to overhang and be engaged by said end member of the beam when the beam is deflected from the horizontal to serve as stops to limit the deflecting movement of the beam.

From the foregoing description it will be understood that the frictional contact between the disks 37, 38 and rollers 34, 35 obtained by the outward pressure of the springs 45 must exceed the weight of the counterpoise carriage with the rollers acting parallel to the longitudinal center line of the weighing beam when the beam is deflected from the horizontal position, otherwise by placing a load upon the scale pan or platform as the end of the beam is deflected upward to engage the stop formed by the upper end wall of the arm recess 56 slipping would occur between the driving disks and rollers and the counterpoise carriage could not be moved along the scale beam. While the yielding pressure of the springs between the driving disks and rollers is sufficient to maintain the driving disks in frictional contact with the rollers with sufficient force to move the counterpoise weight in weighing mechanism adapted to weigh light loads, or in weighing mechanism to weigh comparatively heavy loads after the counterpoise carriage has been moved to position where the scale beam approaches the equilibrium, as a minimum pressure of the disks against the rollers is then only required, and any action of the contact between the disks and rollers that would tend to disturb the free equilibrium of the beam is reduced to a minimum as the beam approaches a position of equilibrium, to adapt the same to weighing mechanism for weighing heavy loads, as for instance in platform scales, requiring a counterpoise weight carriage of considerable weight to counterbalance a load, to increase the pressure of the frictional contact of the driving disks against the rollers in proportion to the weight of the load on the weighing beam that is unbalanced by the beam, means are provided to cause the driving disks to forcibly engage and increase the pressure of the driving disks against the rollers. For this purpose the beam stop is in the form of a lever 58 mounted to rock on a pin 59 fixed in an arm 60 of one of the brackets 42 (Figures 1, 2, 5 and 7) to extend transversely of and below the side members of the scale beam. In this case the friction disk carrying arms 40, 43 are fixed to the shafts 41, 44 and the lever 58 is connected to said shafts by a pair of levers 101 secured to the projecting ends of the shafts (Figure 4) and which levers are connected by links 102 to a double clevis 103 connected to the lever 58 at one side of its pivotal support. When the weighing beam is deflected from the equilibrium by a load supported thereby a striker 104 carried by the beam will engage one end of the lever 58 rocking said lever on its support 59 and thereby rocking the shafts 41, 44 through the clevis and connected links and levers in a direction to move the driving disk carrying arms toward, and the disks forcibly into engagement with, the rollers 34, 35. When the counterpoise carriage is moved far enough along the beam to nearly counterbalance the load the striker 104 will recede from the lever 58 and only the pressure of the springs 45 will be exerted upon the driving disks. As the weighing beam is deflected in an opposite direction by the relieving of the same of the weight of the load a lateral projecting portion of a striker 105 fixed to the beam opposite to the striker 104 will engage the underside of the opposite end of the lever 58 again imparting movement to the lever to rock the driving disk arm carrying shafts 41, 44 to cause the driving disks to forcibly engage the rollers 34, 35 in a manner as above described.

To make a record of successive weighings impression making or printing devices are provided. This mechanism comprises an auxiliary graduated beam 70 (Figure 10) having raised digits or indices reading from right to left, and in a direction opposite to the digits or indices of the graduations of the weighing or scale beam. This beam has laterally extending arms 71 substantially of inverted U-shape whereby it is secured to the counterpoise carriage to extend in front of the weighing beam and arranged with the "0" digit in line with the axis of the pivotal support of the scale beam, as shown in Figures 8 and 9. It will be obvious that as the counterpoise carriage is moved along the scale beam so that the pointer will register, for instance, with the digit "2" on the weighing beam that the auxiliary beam will be moved with the counterpoise carriage a corresponding distance and the digit "2" of such beam will be in line with the axis of the pivotal support of the weighing beam. The record is made on a strip or web of paper or the like 72 which may be wound on a spool 73 rotatably mounted on a pin 74 fixed in a laterally projecting arm 75 of a bracket 76 fixed to the shelf 20 of the framework, the strip being fed through a guide 77 secured at the inner end of a tubular portion 78 at the upper end of the bracket 76, and said guide having an open side in register and opposite to the line of digits on the auxiliary beam 70 (Figure 15). An inking ribbon 79 is adapted to be fed transverse of the paper strip from a spool 80 to a spool 81 rotatably carried by arms 82, 83, respectively, secured to and projecting downwardly and upwardly from the inner end of the tubular portion 78 of the bracket 76. The impression is made upon the strip from the auxiliary beam by a plunger 84 mounted in the tubular portion 78 to have a limited movement, and normally moved outwardly by a spring 85. To make an impression upon the paper strip the plunger 84 is moved inward against the tension of the spring 85 impinging the ribbon and the paper strip against a digit of the auxiliary beam in line with the plunger. To feed the ribbon as each impression is made a pawl 86 pivotally supported upon a pin 87, fixed in the plunger and extending through a slot in the tubular portion 78, and which pin also serves to limit the movement of the plunger, is caused to co-operate with a ratchet wheel 88 by the inward and outward movement of the plunger. The paper strip 72 is pulled through the guide by hand and may be torn off or severed by using the end 89 of the guide as a cutting edge. The strip may be readily drawn through the guide by frictionally engaging the same by the finger through the open side of the guide.

To indicate by the printed record whether or not the weighing beam was at equilibrium at the time the record was made the paper strip may have a line printed thereon extending parallel with the longitudinal edges, as shown at 100, (Figures 11 to 14,) and the graduated auxiliary beam provided with a raised ledge or line 70' extending longitudinally thereof. Should the scale beam be in true equilibrium, as shown in Figure 11, and the plunger 84 moved to impression making position, a record will be made on the strip as shown by the number "5" in Figure 12 with a horizontal scoring line below the character and which line will be parallel with the line 100 on the strip. Should the weighing beam, and thereby the auxiliary beam 70, be out of equilibrium at the time the record is made, as shown in an exaggerated manner in Figure 13 and the plunger 84 moved to impression making position, the record will appear as indicated by the character "5" in Figure 14 with the underscoring line of said character made by the raised horizontal raised line 70' of the auxiliary scale beam out of parallel with the line 100 on the paper strip, and thus clearly indicate that the weighing beam was not in equilibrium at the time the record was made.

To totalize and indicate the total weight of successive weighings a counter 90 is provided. This counter is carried by the scale beam 17 by a bracket 91 at the side opposite to the graduated side and the impression making or printing devices, and with the axis of rotation of the numbering wheels of the counter in line with the axis of the pivotal support of the weighing beam. The counter is operatively connected to and actuated by the movement of the counterpoise carriage. For this purpose one of the longitudinal sides of the carriage is provided with rack teeth 92 with which a gear 93 meshes, said gear being fixed to a shaft 94 journaled in the scale beam 17 with the axis in line with the axis of the pivotal support of the scale beam. The shaft 94 has a pinion 95 fixed at the end opposite to the gear 93, which meshes with a gear 96 loose on the number wheel shaft 97, said gear pivotally carrying a pawl 98 to co-operate with a ratchet wheel 99 fixed to the shaft of the counter. The pawl and ratchet mechanism 98, 99 is so arranged that as the counterpoise weight carriage moves along the weighing beam to position to counterbalance a load it will operate to rotate the gear 96 but that the pawl will ride over the teeth of the ratchet wheel 99, and as the counterpoise carriage returns to initial no load position the gear 96 will be rotated in reverse direction and the pawl caused to engage a tooth of the ratchet wheel 99 and impart movement to the number wheels of the counter.

Having thus described my invention, I claim:

1. In weighing mechanism, a scale beam arranged to have a load receiver connected thereto; a counterpoise movable along the beam; and continuously operating means connected to the counterpoise operable to maintain the counterpoise against movement when the scale beam is in equilibrium and automatically operative to move the counterpoise along the beam when the beam is moved out of equilibrium by the placing of a load on or the removal of a load from the scale beam to bring the beam into equilibrium.

2. In weighing mechanism, a pivotally supported graduated scale beam arranged to have a load receiver connected thereto, a counterpoise movable along the beam including a rotatable member; driving means independent of the counterpoise to co-operate with the rotatable member thereof to move the counterpoise along the beam when the beam is deflected by a load placed upon the receiver to counterbalance the load on the receiver and bring the beam to equilibrium; and means carried by the counterpoise to co-operate with the graduations on the scale beam to indicate the weight of the load on the scale beam.

3. In weighing mechanism, a scale beam, adjustable counterpoise to bring the beam into balance including a rotatable friction member, and a continuously rotating friction element with which the rotatable member of the counterpoise co-operates when the beam is moved out of equilibrium to adjust the counterpoise to bring the beam into balance.

4. In weighing mechanism, a scale beam, a counterpoise including a rotatable element with its axis extending parallel with the beam and movable longitudinally of the beam, and a continuously rotating element to frictionally co-operate with the rotatable element of the counterpoise to move the counterpoise longitudinally of the beam when the beam is moved out of equilibrium to bring the beam into balance.

5. In weighing mechanism, a scale beam, adjustable counterpoise weight to counterbalance a load supported by the scale beam, and continuously rotating mechanical means operative to retain the poise weight against movement when the beam is in equilibrium and automatically operative to adjust the poise weight when the beam is deflected to underload or overload position and bring the beam into balance.

6. In weighing mechanism, a scale beam; a counterpoise to travel along the beam including a rotatable roller; and a rotatable disk to frictionally engage the roller and operative to exert a thrust in axial direction to the roller to move the counterpoise along the beam when the beam is deflected from the equilibrium for the purpose specified.

7. In weighing mechanism, a scale beam; a counterpoise comprising a carriage movably mounted upon the beam; and a pair of co-operating rotatable members, one of which is mounted upon the carriage and the other upon the frame of the weighing mechanism, and one of which is driven and co-acts with the other to move the carriage along the beam when the beam is deflected for the purpose specified.

8. In weighing mechanism, a scale beam; a counterpoise comprising a carriage movably mounted upon the beam, and a roller rotatably mounted upon the carriage with its axis parallel with the beam; and a friction disk to co-act with the roller to move the carriage along the beam when the beam is deflected for the purpose specified.

9. In weighing mechanism, a pivotally supported scale beam; a counterpoise comprising a carriage movably mounted upon the beam and rotatably carrying a pair of rollers; and a pair of disks to frictionally engage and coact with the rollers to move the carriage along the beam when the latter is deflected from the horizontal for the purpose specified.

10. In weighing mechanism, a pivotally supported scale beam; a counterpoise comprising a carriage movably mounted upon the beam and carrying a pair of rollers rotatable upon axes parallel with the beam; and a pair of disks rotating on axes parallel with the scale beam when the latter is in equilibrium said disk coacting with the rollers when the beam is deflected from the equilibrium to move the carriage along the beam for the purpose specified.

11. In weighing mechanism, a pivotally supported scale beam; a carriage mounted upon the beam to travel along the same; a pair of rollers rotatably mounted upon the carriage with the axes in a plane parallel with the scale beam; a pair of disks rotatable on axes at right angles to and in line with the pivotal support of the beam and to frictionally engage the carriage rollers; and means to rotate said disks in opposite directions for the purpose specified.

12. In weighing mechanism a pivotally supported scale beam arranged with tracks; a carriage having rollers to support the carriage upon the beam tracks to travel along the same; a pair of rollers mounted upon the carriage to rotate on parallel axes and in a plane with the beam; a pair of disks rotatable on axes at right angles to and in a line with the axis of the beam support to frictionally engage the rollers and adapted to coact with the rollers to move the carriage along the beam when the beam is deflected from the equilibrium; and means to rotate said disks in opposite directions for the purpose specified.

13. In weighing mechanism, a pivotally supported scale beam; a counterpoise carriage movably mounted upon the beam; a pair of rollers rotatably mounted upon the carriage with the axes thereof parallel with the beam; a pair of movably supported disks continuously rotating in opposite directions to frictionally engage and drive the rollers; means normally urging the disks to engage the rollers; and means to cause the disks to forcibly engage the rollers when the beam is deflected from equilibrium for the purpose specified.

14. In weighing mechanism, a pivotally supported scale beam; a counterpoise carriage movably mounted upon the beam; a pair of rollers rotatably mounted upon the carriage with the axes thereof parallel with the beam; a pair of disks continuously rotating in opposite directions to frictionally engage the rollers; pivotal supports for the rollers; and means operable by the beam when the beam is deflected from equilibrium to move the disk supports to cause the disks to forcibly engage the carriage rollers for the purpose specified.

15. In weighing mechanism a pivotally supported scale beam; a counterpoise carriage movably mounted upon the beam; a pair of rollers rotatably mounted upon the carriage with the axes thereof parallel with the beam; a pair of disks continuously rotating in opposite directions to frictionally engage the rollers; pivotal supports for the rollers; and means operable to move the disk supports to cause the disks to forcibly engage the carriage rollers, comprising a pivoted lever, a clevis connected to the lever, and a pair of bell crank levers connected to the clevis and the disk supports, and said lever adapted to be rocked by the scale beam as the latter is deflected from equilibrium.

16. In weighing mechanism, a pivotally supported scale beam arranged with graduations to indicate the weight of a load; a counterpoise weight movably mounted upon the beam carrying an auxiliary graduated beam with the zero digit thereof in line with the axis of the pivotal support of the scale beam in the normal position of the weighing mechanism and having means to indicate the weight of a load upon the graduations of the scale beam; means to make a record of a weighed load from the auxiliary beam; and means operative when the scale beam is deflected from equilibrium to move the counterpoise weight along the beam for the purpose specified.

17. In weighing mechanism, a pivotally supported scale beam; a counterpoise carriage movably supported upon the scale beam; a pair of rollers carried by the carriage to rotate on axes parallel with the scale beam and in a plane in line with the axis of the pivotal support of the scale beam; a pair of disks to frictionally engage the rollers and continuously rotatable on axes parallel with each other and the axes of the rollers and at right angles to the axis of the scale beam support, and the disks rotating and contacting with the rollers in a plane in line with the axis of the scale beam support for the purpose specified.

18. In weighing mechanism, a pivotally supported scale beam; a counterpoise carriage movably supported upon the beam; a pair of rollers carried by the carriage to rotate on axes parallel with the scale beam; a pair of disks supported independent of the scale beam and counterpoise carriage and rotatable on parallel axes and in a plane with the axes of the rollers to frictionally engage and rotate the rollers and adapted to move the carriage when the beam is deflected from equilibrium; a graduated beam carried by the carriage with the zero indice in line with the axis of the scale beam support and arranged as impression making devices; and means to make an impression from said indices for the purpose specified.

19. In weighing mechanism, a pivotally supported scale beam; a counterpoise weight movably mounted upon the scale beam; means to automatically move the counterpoise weight along the beam when the beam is deflected from equilibrium; a graduated beam carried by the counterpoise weight having indices with the zero indice in line with the axis of the scale beam support in the normal position of the weighing mechanism; and means to make a record from said counterpoise weight beam of a weighed load and to indicate whether or not the scale beam was at equilibrium at the time of making the record.

20. In weighing mechanism, a load support, counterpoise weight adjustable to counterbalance a load upon the support, and continuously operating mechanically actuated cooperating friction means automatically operative to adjust the counterpoise weight to position to counterbalance a load applied to the load support and return the counterpoise to initial dead weight position when the load is removed.

21. In weighing mechanism, a scale beam arranged to support a load; a counterpoise movably supported upon the scale beam; means to automatically move the counterpoise along the scale beam to counterbalance a load supported by the scale beam; a counter; a rack connected to and movable with the counterpoise; and an operative connection between said rack and counter to totalize the weight of successive weighings.

22. In weighing mechanism, a scale beam arranged to support a load; a counterpoise movably supported upon the scale beam; means to mechanically move said counterpoise along the scale beam to counterbalance a load supported by the scale beam and return the counterpoise to initial position when the load is removed from the scale beam; a rack movable with the counterpoise; a counter; and an operative connection between said rack and the counter to maintain the counter idle during the movement of the counterpoise in one direction along the scale beam and to actuate the counter to totalize the weight of successive weighings when the counterpoise moves in the opposite direction.

23. In weighing mechanism a graduated scale beam arranged to support a load; a counterpoise movably mounted upon the scale beam and having means to co-operate with the graduations of the scale beam to indicate the weight of successive weighings; an auxiliary beam carried by the counterpoise having impression making digits; means operative to make a record of successive weighings from the digits on the auxiliary beam; a counter; and means to connect the counter to the counterpoise operative when the counterpoise is moved in one direction to actuate the counter to totalize the weight of successive weighings.

24. In weighing mechanism, a pivotally supported scale beam arranged to support a load therefrom; a counterpoise movable along the beam; and means operative when the beam is moved out of equilibrium to automatically move the counterpoise along the beam from its initial position of equilibrium until the counterpoise is in position to balance the load supported by the scale beam, said movement of the counterpoise being at a velocity varying with the deflection of the beam.

25. In weighing mechanism, a pivotally supported scale beam arranged to support a load therefrom; a counterpoise movable along the beam; and rotatable means automatically operative when the beam is moved out of equilibrium by a load applied thereto to move the counterpoise along the beam until the counterpoise is in position to balance the load supported by the beam and retain the counterpoise in such position without retarding the rotation of the rotatable means, said movement of the counterpoise being at a velocity varying with the amount of deflection of the beam.

26. In weighing mechanism, a scale beam; a counterpoise movably mounted upon the beam; co-operating rotatable friction members, one of which is connected to the counterpoise and the other mounted upon the frame of the weighing mechanism, and the direction of travel of one of which members in angular relation to the axis of the other member acts upon the latter to move the counterpoise along the beam when the beam is deflected; and means to cause said members to forcibly engage when the beam is deflected from the equilibrium for the purpose specified.

27. In weighing mechanism, a pivotally supported scale beam arranged to support a load therefrom; a counterpoise movable along the beam to counterbalance a load supported thereby; and means having connection with the counterpoise operative when the beam is moved out of equilibrium by a load applied thereto to move the counterpoise along the beam to counterbalance such load, said movement of the counterpoise along the beam being at a varying velocity dependent upon the amount of deflection of the beam.

28. In weighing mechanism, counterpoise to bring the weighing mechanism into equilibrium; a pair of frictionally contacting travelling members one of which is movable with the counterpoise; means to drive said members; and means to change the direction of travel of one of said members in angular relation to the direction of travel of the other member to impart longitudinal movement to the latter member.

29. In weighing mechanism, counterpoise to bring the weighing mechanism into equilibrium; a pair of traveling members one of which is movable with the counterpoise; means to drive one of said members and the other of which members is frictionally driven from the first member; and means to change the direction of travel of one of said members in angular relation to the direction of travel of the other member to impart longitudinal movement to the latter member.

30. In weighing mechanism, a scale beam, adjustable counterpoise to bring the beam into balance when moved out of equilibrium, power operated counterpoise adjusting means, and means operative through the deflecting movements of the beam to control the counterpoise adjusting means including a pair of contacting rotatable friction surfaces the direction of travel of one of which surfaces is changeable in angular relation to the direction of travel of the other surface.

Signed at New York city in the county of New York and State of New York, this 1st day of December 1920.

HERBERT L. MERRICK.